United States Patent
Shao et al.

(10) Patent No.: US 11,906,948 B2
(45) Date of Patent: Feb. 20, 2024

(54) INDUSTRIAL INTERNET OF THINGS FOR IMPLEMENTING PRODUCTION TASK PLANS AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yuefei Wu, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/170,026

(22) Filed: Feb. 16, 2023

(65) Prior Publication Data
US 2023/0195090 A1    Jun. 22, 2023

(30) Foreign Application Priority Data
Jun. 28, 2022    (CN) .......................... 202210738629.0

(51) Int. Cl.
G05B 19/418    (2006.01)
(52) U.S. Cl.
CPC .  *G05B 19/41865* (2013.01); *G05B 19/41835* (2013.01)
(58) Field of Classification Search
None
See application file for complete search history.

(56) References Cited

U.S. PATENT DOCUMENTS

| 5,432,507 A * | 7/1995 | Mussino | H04Q 9/00 340/870.07 |
| 6,874,691 B1 * | 4/2005 | Hildebrand | H04L 12/2818 236/51 |

(Continued)

FOREIGN PATENT DOCUMENTS

| CN | 107393293 A | 11/2017 |
| CN | 108183945 A | 6/2018 |

(Continued)

OTHER PUBLICATIONS

First Office Action in Chinese Application No. 202210738629.0 dated Aug. 4, 2022, 12 pages.

(Continued)

*Primary Examiner* — Jason Lin
(74) *Attorney, Agent, or Firm* — METIS IP LLC

(57) ABSTRACT

The present disclosure provides an Industrial Internet of Things for implementing a production task plan, including at least one user platform, a service platform, a management platform, a sensor network platform, and one or more object platforms that are interacted sequentially from top to bottom; the service platform is arranged in an independent layout, the management platform is arranged in a front sub platform layout, and the sensor network platform is arranged in a rear sub platform layout; the one or more object platforms are configured as one or more intelligent manufacturing devices or one or more manufacturing management devices.

9 Claims, 5 Drawing Sheets

(56) References Cited

U.S. PATENT DOCUMENTS

| | | | | |
|---|---|---|---|---|
| 6,885,309 | B1* | 4/2005 | Van Heteren | G08C 15/06 340/870.11 |
| 9,513,637 | B2* | 12/2016 | Shao | G01F 15/063 |
| 10,575,072 | B1* | 2/2020 | Shao | H04Q 9/00 |
| 11,086,298 | B2* | 8/2021 | Chand | G05B 19/0426 |
| 11,435,726 | B2* | 9/2022 | Sayyarrodsari | G06Q 10/063 |
| 11,579,593 | B1* | 2/2023 | Shao | G05B 19/41815 |
| 11,586,183 | B1* | 2/2023 | Shao | G05B 19/4185 |
| 11,625,028 | B1* | 4/2023 | Shao | G05B 19/4185 700/95 |
| 2008/0082297 | A1* | 4/2008 | Lundeberg | G05B 23/024 702/183 |
| 2009/0204237 | A1* | 8/2009 | Sustaeta | G06Q 10/04 700/106 |
| 2009/0284392 | A1* | 11/2009 | Henderson | G01D 5/145 340/870.3 |
| 2012/0154171 | A1* | 6/2012 | Hurri | H04Q 9/00 340/870.02 |
| 2014/0310036 | A1* | 10/2014 | Grosso | G06Q 30/0201 705/7.11 |
| 2016/0313294 | A1* | 10/2016 | Dattilo | G06Q 10/06 |
| 2018/0018288 | A1 | 1/2018 | Dewan et al. | |
| 2019/0339221 | A1* | 11/2019 | Bhavaraju | G01N 27/3274 |
| 2022/0245574 | A1* | 8/2022 | Cella | G06F 9/451 |

FOREIGN PATENT DOCUMENTS

| | | |
|---|---|---|
| CN | 111028110 A | 4/2020 |
| CN | 114449023 A | 5/2022 |
| CN | 114488988 A | 5/2022 |
| CN | 114511397 A | 5/2022 |
| CN | 114612262 A | 6/2022 |
| CN | 114663250 A | 6/2022 |

OTHER PUBLICATIONS

Notification to Grant Patent Right for Invention in Chinese Application No. 202210738629.0 dated Aug. 8, 2022, 6 pages.

Xu, Yuzhi et al., Application of IOT Technology Platform in Job-Shop Scheduling, Computer Measurement & Control, 20(6): 1686-1688, 2012.

Pang, Jianzhe et al., Life Cycle Management of Aviation Materials Based on IOT Technology, Innovation World Weekly, 2018, 10 pages.

* cited by examiner

S1: The sub platforms of the service platform respectively correspond to different user platforms, when any user platform issues a production task plan modification instruction based on an input of the user, a production task plan modification data table is generated, a corresponding sub platform of the service platform receives the production task plan modification data table and attaches an instruction number to the production task plan modification data table, merges the instruction number with the production task plan modification data table to form a first instruction and sends the first instruction to the general platform of the management platform S2: The general platform of the management platform receives the first instruction, extracts data association platform information and instruction data corresponding to the data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information S3: The sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, respectively S4: The sub platforms of the sensor network platform receive the configuration files and send the configuration files to the general platform of the sensor network platform, respectively S5: After receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files

INDUSTRIAL INTERNET OF THINGS FOR IMPLEMENTING PRODUCTION TASK PLANS AND CONTROL METHODS THEREOF

CROSS-REFERENCE TO RELATED APPLICATIONS

The application claims priority to Chinese Patent Application No. 202210738629.0, filed on Jun. 28, 2022, the contents of which may be hereby incorporated by reference to its entirety.

TECHNICAL FIELD

The present disclosure generally relates to intelligent manufacturing, and in particular to Industrial Internet of Things for implementing a production task plan and control methods thereof.

BACKGROUND

The production task plan is a plan for an enterprise to make overall arrangements for production tasks and specifically draw up the variety, quantity, quality, and progress of production products. The production task plan is an important part of the enterprise's business plan and an important basis for the enterprise's production management. The production task plan is not only an important means to achieve the enterprise's business objectives, but also a basis for organizing and guiding the planned production activities of the enterprise.

The production task plan is generally set to satisfy customer requirements or enable the enterprise to prepare, distribute and manufacture accurately. During the implementation of the production task plan, the enterprise may generally involve related workshops, equipment, processes, parameters, etc., which may involve a wide range of areas and equipment. When a production task plan is issued, coordination and data exchange between a plurality of systems may be often required to better realize the whole production task plan.

In the field of intelligent manufacturing technology, the implementation of the production task plan may involve many workshops and equipment, and the intelligent manufacturing may be basically unmanned workshops and unmanned equipment. Therefore, the implementation of the production task plan may involve a problem of multi workshops and multi equipment. It may be difficult for the production task plan to realize the data transfer of all related workshops or equipment at one time, and it may involve more data interaction, as a result, the complex Internet of Things may be required for data interaction. Due to the diversity of data flows, the Internet of Things may also be prone to data interaction errors. These problems all make the Internet of Things difficult to jointly implement the production task plan and realize the overall control of the production task plan in the field of intelligent manufacturing technology.

SUMMARY

The technical problem to be solved by the present disclosure is to provide an Industrial Internet of Things for implementing a production task plan. The Internet of Things enables each object platform, management platform, sensor network platform and user platform to independently realize data transmission and processing by reasonably building the Internet of Things structure and reasonably classifying the data processing objects and paths of each management platform. At the same time, the management platform and the sensor network platform can also realize the integration and classification of data through a sub platform design. Therefore, the production task plan can be effectively decomposed or integrated, and the independent data processing platform and path are used to realize data processing, transmission and storage, and all user platforms and object platforms are integrated and associated, so that the production task plan can be well implemented.

The present disclosure is implemented by a following technical scheme, which is an Industrial Internet of Things for implementing a production task plan. The Industrial Internet of Things includes: a plan module configured to receive a modification instruction from a user and determine a modification plan; and an instruction distribution module configured to determine an execution instruction based on the modification plan and distribute the execution instruction.

In some embodiments, the Industrial Internet of Things comprises at least one user platform, a service platform, a management platform, a sensor network platform, and one or more object platforms that are interacted sequentially from top to bottom. The plan module is executed by the service platform and the management platform, and the instruction distribution module is executed by the sensor network platform. The service platform is arranged in an independent layout, the management platform is arranged in a front sub platform layout, and the sensor network platform is arranged in a rear sub platform layout. The independent layout means that the service platform is provided with a plurality of independent sub platforms, the plurality of independent sub platforms respectively store, process and/or transmit different data. The front sub platform layout means that the management platform is provided with a general platform and a plurality of sub platforms, the plurality of sub platforms respectively store and process data of different types or different receiving objects sent by the sensor network platform, and after summarizing data of the a plurality of sub platforms, the general platform of the management platform stores and processes the data, and transmits the data to the service platform. The rear sub platform layout means that the sensor network platform is provided with a general platform and a plurality of sub platforms, the plurality of sub platforms respectively store and process data of different types or different receiving objects sent by the management platform, and the general platform of the sensor network platform summarizes data of the plurality of sub platforms of the sensor network platform, stores and processes the data, and transmits the data to the one or more object platforms. The one or more object platforms are configured as one or more intelligent manufacturing devices or one or more manufacturing management devices. The sub platforms of the service platform respectively correspond to different user platforms. When any user platform issues a production task plan modification instruction based on an input of the user, a production task plan modification data table is generated, a corresponding sub platform of the service platform receives the production task plan modification data table and attaches an instruction number to the production task plan modification data table, merges the instruction number with the production task plan modification data table to form a first instruction and sends the first instruction to the general platform of the management platform. The general platform of the management platform receives the first instruction, extracts data association platform information and instruction data corresponding to the data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information. The sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, respectively. The sub platforms of the sensor network platform receive the configuration files and send the configuration files to the general platform of the sensor network platform, respectively; and after receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files.

Based on the above technical scheme, when any user platform issues a production task plan modification instruction based on an input of the user, a production task plan modification data table is generated, including: any user platform issuing the production task plan modification instruction to one or more object platforms based on the production task plan; the one or more object platforms respectively corresponding to the independent sub platforms of the management platform and the independent sub platforms of the sensor network platform, the management platform taking the one or more object platforms and the corresponding independent sub platforms of the management platform and the corresponding independent sub platforms of the sensor network platform as the data association platform information, and matching the data association platform information with the corresponding production task plan modification instruction to generate one or more production task plan modification data; and the management platform taking the data association platform information and the corresponding production task plan modification data as one data item, and arranging all data items in order to form the production task plan modification data table.

Based on the above technical scheme, the general platform of the management platform receives the first instruction, extracts data association platform information and instruction data corresponding to the data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information, including: the general platform of the management platform receiving the first instruction, taking each data item in the production task plan modification data table as independent extracted data, and merging the data association platform information in each data item with corresponding instruction data to form the instruction data packet; the general platform of the management platform extracting the instruction number and merging the instruction number with each instruction data packet to form one or more independent second instructions; and the general platform of the management platform sending the one or more second instructions to the corresponding sub platforms of the management platform respectively according to sub platform information of the management platform of the data association platform information in each second instruction.

Based on the above technical scheme, the sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, including: the sub platforms of the management platform storing the production task plans, the production task plans at least including production task plan data packets; the sub platforms of the management platform extracting the instruction data in the second instruction after receiving the corresponding second instruction; the sub platforms of the management platform overwriting the production task plan data packets with the instruction data as update data to form latest production task plan data packets; and the sub platforms of the management platform packaging and converting the updated production task plans, the instruction number and the data association platform information into the configuration files recognizable by the one or more object platforms, storing the configuration files and sending the configuration files to the sub platform of the sensor network platform corresponding to the data association platform information, respectively.

Based on the above technical scheme, after receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files, including: after receiving the second instructions, the sub platforms of the management platform sending prompt information to the general platform of the sensor network platform through corresponding sub platforms of the sensor network platform, respectively; after receiving the prompt information, the general platform of the sensor network platform waiting for receiving the configuration files; after receiving the configuration files of all the sub platforms of management platform that send the prompt information, the general platform of the sensor network platform sending the configuration files to corresponding object platforms according to sub platform information of the sensor network platform in the configuration files, respectively; and after receiving the configuration files, the one or more object platforms executing the production tasks based on the configuration files.

Based on the above technical scheme, after receiving the configuration files, the one or more object platforms executes the production tasks based on the configuration files, merges the data association platform information and execution results as feedback data packets, which are fed back to the general platform of the sensor network platform; the general platform of the sensor network platform sends the feedback data packets to the sub platforms of the sensor network platform according to the data association platform information; the sub platforms of the sensor network platform receive the feedback data packets and send the feedback data packets to corresponding sub platforms of the management platform, respectively; the sub platforms of the management platform receive and store the feedback data packets, convert the feedback data packets into data files recognizable by the management platform, and send the data files to the general platform of the management platform; and the general platform of the management platform receives the data files and send the data files to corresponding user platforms according to the instruction numbers.

Based on the above technical scheme, the general platform of the management platform extracts all the sub platform information of the management platform corresponding to the data association platform information in the data files based on the data files, and obtains the at least one user platform corresponding to all the sub platforms of the management platform; and the general platform of the management platform sends the data files to the at least one corresponding user platform according to the instruction numbers, and simultaneously sends the data files to the at least one user platform corresponding to all the sub platforms of the management platform, respectively.

Based on the above technical scheme, when the instruction data packet further includes an instruction execution time; after receiving the configuration files, the one or more object platforms obtain execution times and execute corresponding production task at the execution times.

Based on the above technical scheme, the Industrial Internet of Things is configured for production management of an industrial production line, the modification instruction includes an industrial production task modification instruction input by the user, and the planning module is further configured to: obtain raw material data, and determine target process parameters of process equipment included in the industrial production line based on the raw material data, and determine the modification plan based on the target process parameters.

Based on the above technical scheme, the planning module is further configured to: obtain reference material data from a database, the database including a plurality of groups of reference data, each group of reference data including the reference material data and the reference process parameters, and the reference material data and the reference process parameters corresponding to each other one by one; match the raw material data with the reference material data, determine target reference material data whose matching relationship satisfies a preset condition, and take process parameters corresponding to the target reference material data as first candidate process parameters; and determine the target process parameters based on the first candidate process parameters.

Based on the above technical scheme, the planning module is further configured to: perform at least one iteration on the first candidate process parameters based on a preset algorithm to obtain second candidate process parameters; and determine the target process parameters based on cost values corresponding to the second candidate process parameters.

Based on the above technical scheme, the at least one iteration comprises: updating change rates to be updated to obtain updated change rates; updating process parameters to be updated based on the updated change rates to obtain updated process parameters; taking the updated process parameters as the process parameters to be updated in a next round and taking the updated change rates as change rates to be updated in the next round until a first preset condition is satisfied, and the iteration ends; the process parameters to be updated in a first round being the first candidate process parameters, and the change rates to be updated in the first round being preset values; and determining the second candidate process parameters based on the updated process parameters.

Based on the above technical scheme, the process parameters to be updated include a plurality of sub process parameters to be updated, the change rates include a plurality of sub change rates, and each sub process parameter to be updated has a one-to-one correspondence with each sub change rate. The updating a sub change rate to be updated in the change rates to be updated includes: updating the sub change rate to be updated based on a current loss in a previous round, and the updated sub change rate being used as a sub change rate to be updated in the next round. The current loss in the previous round is determined based on a difference between the second candidate process parameters in the previous round and historical optimal second candidate process parameters.

Based on the above technical scheme, the planning module is further configured to: determine whether to take the updated process parameters as the second candidate process parameters based on whether the updated process parameters satisfy a second preset condition. The second preset condition comprises: whether each sub process parameter in the updated process parameters conforms to a first preset range; and whether relationship values between different sub process parameters conform to a second preset range.

The present disclosure also provides a control method of an Industrial Internet of Things for implementing a production task plan base on the above Internet of Things for implementing a production task plan. The method comprises: receiving a modification instruction from a user and determining a modification plan; and determining an execution instruction based on the modification plan and distributing the execution instruction. The method is executed based on the Industrial Internet of Things for implementing the production task plan. The Industrial Internet of Things includes: at least one user platform, a service platform, a management platform, a sensor network platform, and at least one object platform that are interacted sequentially from top to bottom. The service platform is arranged in an independent layout, the management platform is arranged in a front sub platform layout, and the sensor network platform is arranged in a rear sub platform layout. The independent layout means that the service platform is provided with a plurality of independent sub platforms, the plurality of independent sub platforms respectively store, process and/or transmit different data. The front sub platform layout means that the management platform is provided with a general platform and a plurality of sub platforms, the plurality of sub platforms respectively store and process data of different types or different receiving objects sent by the sensor network platform, and after summarizing data of the a plurality of sub platforms, the general platform of the management platform stores and processes the data, and transmits the data to the service platform. The rear sub platform layout means that the sensor network platform is provided with a general platform and a plurality of sub platforms, the plurality of sub platforms respectively store and process data of different types or different receiving objects sent by the management platform, and the general platform of the sensor network platform summarizes data of the plurality of sub platforms of the sensor network platform, stores and processes the data, and transmits the data to the one or more object platforms. The one or more object platforms is configured as an intelligent manufacturing device or a manufacturing management device. The control method comprises: the sub platforms of the service platform respectively corresponding to different user platforms, when any user platform issues a production task plan modification instruction based on an input of the user, a production task plan modification data table being generated, a corresponding sub platform of the service platform receiving the production task plan modification data table and attaching an instruction number to the production task plan modification data table, merging the instruction number with the production task plan modification data table to form a first instruction and sending the first instruction to the general platform of the management platform; the general platform of the management platform receiving the first instruction, extracting data association platform information and instruction data corresponding to the data association platform information in the production task plan modification data table based on the production task plan modification data table to form one or more independent instruction data packets, merging the instruction number with the one or more instruction data packets respectively to form one or more second instructions and sending the one or more second instructions to associated sub platforms of the management platform respectively according to the data association platform information; the sub platforms of the management platform receiving the corresponding second instructions, extracting instruction data in the second instruction and updating production task plans of the sub platforms of the management platform, packaging and converting the instruction number, the data association platform information and the updated production task plans into configuration files recognizable by the one or more object platforms, storing the configuration files and send the configuration files to corresponding sub platforms of the sensor network platform; the sub platforms of the sensor network platform receiving the configuration files and sending the configuration files to the general platform of the sensor network platform; and after receiving the configuration files of all sub platforms of the management platform, the general platform of the sensor network platform sending the configuration files to the one or more object platforms corresponding to the data association platform information according to the data association platform information at a same time, after receiving the configuration files, the one or more object platforms executing production tasks based on the configuration files.

Based on the above technical scheme, the method is used for production management of an industrial production line, and the method further comprises: obtaining raw material data; and determining target process parameters of process equipment included in the industrial production line based on the raw material data, and determining the modification plan based on the target process parameters.

Based on the above technical scheme, the determining target process parameters of process equipment included in the industrial production line based on the raw material data comprises: obtaining reference material data from a database, the database including a plurality of groups of reference data, each group of reference data including the reference material data and the reference process parameters, and the reference material data and the reference process parameters corresponding to each other one by one; matching the raw material data with the reference material data, determining target reference material data whose matching relationship satisfies a preset condition, and taking process parameters corresponding to the target reference material data as first candidate process parameters; and determining the target process parameters based on the first candidate process parameters.

Based on the above technical scheme, the determining the target process parameters based on the first candidate process parameters comprises: performing at least one iteration on the first candidate process parameters based on a preset algorithm to obtain second candidate process parameters; and determining the target process parameters based on cost values corresponding to the second candidate process parameters.

Compared with the prior art, the beneficial effects of the present disclosure are as follows: the Industrial Internet of Things for implementing a production task plan of the present disclosure may be built based on a five-platform structure, the service platform may be arranged in an independent layout, and each service platform may correspond to a user platform separately, so that each user platform may correspond to a workshop, a factory, or different process management systems, output management systems, etc., causing that each user platform may have an independent service platform to perform data interaction, which is convenient for data management, and solves the problem of large data interaction pressure of a single service platform when a plurality of users use it. The management platform may adopt a front sub platform layout, and may use the general platform of the management platform to decompose and classify the production task plan, and send corresponding data to corresponding sub platforms of the management platform for independent data processing to coordinate all related platforms. The sub platforms of the management platform may be responsible for processing corresponding data. At the same time, the sensor network platform may interface with each sub platform of the management platform through independent sub platforms of the sensor network platform to facilitate independent transmission of data. Finally, all data may be uploaded or downloaded through the general platform of the sensor network platform, and all object platform data may be uniformly sent and received for management, which also facilitates the correspondence of data and simplifies a structure of the Internet of Things as a whole, optimizes data processing path, reduces the data processing and transmission pressure of each platform, and further improves the data processing speed and capacity of each platform.

When the present disclosure is used, different sub platforms of the service platform may correspond to different user platforms, so through this design, any user platform can issue instructions according to its production plan needs, and through the general platform of the management platform, all platforms associated with the instructions may be classified and the instruction may be sent to corresponding platforms, so that the production task plans issued by one or more user platforms may be coordinated and the whole Internet of Things system may be integrated into a large system for unified management and regulation. Moreover, different instruction data may be classified, stored, and processed through each independent sub platform of the management platform, which can reduce the overall data processing pressure of the Internet of Things and reduce the construction cost of the management platform. Moreover, this design may perfectly decompose the instruction data of different object platforms involved in the instruction according to a corresponding sub platform of the management platform and a corresponding sub platform of the sensor network platform, and establish a corresponding transmission path to facilitate the classification and processing of data and the complete implementation of the production task plan. It can realize the updating and implementation of the production task plan of a plurality of regions and a plurality of devices. Meanwhile, through the rear sub platform layout of the sensor network platform, each data may be transmitted independently with the corresponding sub platform of the management platform to ensure the integrity and traceability of data transmission, ensure that the data of each object platform is independent and corresponding without affecting each other, and improve the effectiveness and accuracy of the implementation of the production task plan.

BRIEF DESCRIPTION OF THE DRAWINGS

The accompanying drawings described herein is intended to provide a further understanding of some embodiments of the present disclosure, constitute a part of the present disclosure, and do not constitute a limitation of some embodiments of the present disclosure. In these embodiments, the same number represents the same structure. In the accompanying drawings:

FIG. 2 is a flowchart of a control method of the Industrial Internet of Things for implementing the production task plan according to some embodiments of the present disclosure;

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "one", and/or "this" do not specifically refer to the singular, but may also include the plural. Generally speaking, the terms "include" only indicate that the steps and elements that have been clearly identified are included, and these steps and elements do not constitute an exclusive list. Methods or equipment may also include other steps or elements.

A flowchart is used in the present disclosure to explain the operation performed by the system according to the embodiment of the present disclosure. It should be understood that the previous or subsequent operations are not necessarily performed accurately in order. Instead, the steps may be processed in reverse order or simultaneously. At the same time, you can add other operations to these processes, or remove one or more steps from these processes.

Figure 1:
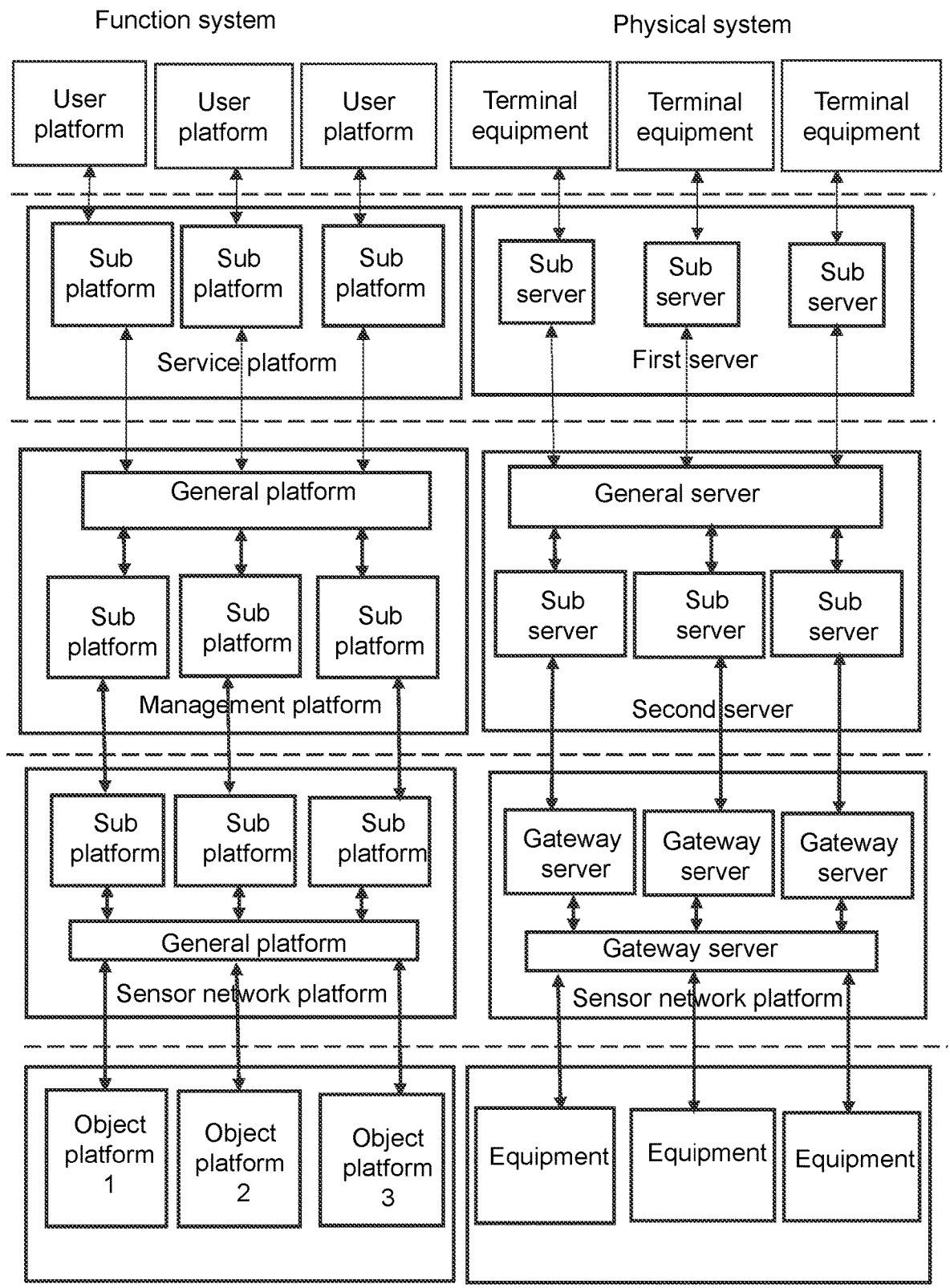
FIG. 1 is a structural frame diagram of the Industrial Internet of Things for implementing the production task plan according to some embodiments of the present disclosure.

As shown in FIG. 1, a first embodiment of the present disclosure aims to provide an Industrial Internet of Things for implementing the production task plan, the Industrial Internet of Things comprising at least one user platform, a service platform, a management platform, a sensor network platform, and one or more object platforms that are interacted sequentially from top to bottom.

The service platform may be arranged in an independent layout, the management platform may be arranged in a front sub platform layout, and the sensor network platform may be arranged in a rear sub platform layout. The independent layout may mean that the service platform may be provided with a plurality of independent sub platforms, the plurality of independent sub platforms may respectively store, process and/or transmit different data. The front sub platform layout may mean that the management platform may be provided with a general platform and a plurality of sub platforms, the plurality of sub platforms may respectively store and process data of different types or different receiving objects sent by the sensor network platform, and after summarizing data of the a plurality of sub platforms, the general platform of the management platform may store and process the data, and transmit the data to the service platform. The rear sub platform layout may mean that the sensor network platform may be provided with a general platform and a plurality of sub platforms, the plurality of sub platforms may respectively store and process data of different types or different receiving objects sent by the management platform, and the general platform of the sensor network platform may summarize data of the plurality of sub platforms of the sensor network platform, store and process the data, and transmit the data to the one or more object platforms. The one or more object platforms may be configured as one or more intelligent manufacturing device or one or more manufacturing management device.

The sub platforms of the service platform may respectively correspond to different user platforms, when any user platform issues a production task plan modification instruction based on an input of the user, a production task plan modification data table may be generated, a corresponding sub platform of the service platform may receive the production task plan modification data table and attach an instruction number to the production task plan modification data table, merge the instruction number with the production task plan modification data table to form a first instruction and send the first instruction to the general platform of the management platform.

The general platform of the management platform may receive the first instruction, extract data association platform information and instruction data corresponding to the data association platform information in the production task plan modification data table based on the production task plan modification data table to form one or more independent instruction data packets, merge the instruction number with the one or more instruction data packets respectively to form one or more second instructions and send the one or more second instructions to associated sub platforms of the management platform respectively according to the data association platform information.

The sub platforms of the management platform may receive the corresponding second instructions, extract instruction data in the second instruction and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform.

The sub platforms of the sensor network platform may receive the configuration files and send the configuration files to the general platform of the sensor network platform.

After receiving the configuration files of all sub platforms of the management platform, the general platform of the sensor network platform may send the configuration files to the one or more object platforms corresponding to the data association platform information according to the data association platform information at a same time, after receiving the configuration files, the one or more object platforms may execute production tasks based on the configuration files.

In the existing technology, in a field of intelligent manufacturing technology, since manufacturing, control and daily management may be basically unmanned designs, when the production task plan is implemented, there are many related workshops, equipment and processes involved. A production task plan may require the cooperation of a plurality of workshops, production lines and equipment to achieve, especially when the production task plan involves the implementation of such as output adjustments, process adjustments, spare parts supplies and so on, it may involve a large amount of equipment and systems for coordination. During the implementation of the plan, due to the large amount and complexity of the equipment, command data, adjustment data, control data, etc. required or generated may be a huge amount of data, which may be basically generated at a certain time or within a certain time period. So many equipment, systems, data processing and transmission may require extremely complex Internet of Things structures for integration and regulation, as well as large data processing and transmission capabilities, while it is difficult to achieve overall regulation when building the Internet of Things. Moreover, due to the need of data processing and transmission, the Internet of Things may require a large data processing capacity and a transmission capacity, resulting in a significant increase in a cost of the Internet of Things. Under a premise that it is difficult and costly to build the Internet of Things, it may be difficult for the production task plan in a large-scale factory to achieve an overall unified control, and may only be re summarized by zoning, which is not conducive to a realization of the intelligent manufacturing.

The Industrial Internet of Things for implementing the production task plan of the present disclosure may be built based on the five-platform structure. The service platform may be arranged in an independent layout, and each service platform may correspond to a user platform separately, so that each user platform may correspond to a workshop, a factory, or different process management systems, output management systems, etc., causing that each user platform may have an independent service platform to perform data interaction, which is convenient for data management, and solves the problem of large data interaction pressure of a single service platform when a plurality of users use it. The management platform may adopt a front sub platform layout, and may use the general platform of the management platform to decompose and classify the production task plan, and send corresponding data to corresponding sub platforms of the management platform for independent data processing to coordinate all related platforms. The sub platforms of the management platform may be responsible for processing corresponding data. At the same time, the sensor network platform may interface with each sub platform of the management platform through independent sub platforms of the sensor network platform to facilitate independent transmission of data. Finally, all data may be uploaded or downloaded through the general platform of the sensor network platform, and all object platform data may be uniformly sent and received for management, which also facilitates the correspondence of data and simplifies a structure of the Internet of Things as a whole, optimizes data processing path, reduces the data processing and transmission pressure of each platform, and further improves the data processing speed and capacity of each platform.

When the present disclosure is used, different sub platforms of the service platform may correspond to different user platforms, so through this design, any user platform can issue instructions according to its production plan needs, and through the general platform of the management platform, all platforms associated with the instructions may be classified and the instruction may be sent to corresponding platforms, so that the production task plans issued by one or more user platforms may be coordinated and the whole Internet of Things system may be integrated into a large system for unified management and regulation. Moreover, different instruction data may be classified, stored, and processed through each independent sub platform of the management platform, which can reduce the overall data processing pressure of the Internet of Things and reduce the construction cost of the management platform. Moreover, this design may perfectly decompose the instruction data of different object platforms involved in the instruction according to a corresponding sub platform of the management platform and a corresponding sub platform of the sensor network platform, and establish a corresponding transmission path to facilitate the classification and processing of data and the complete implementation of the production task plan. It can realize the updating and implementation of the production task plan of a plurality of regions and a plurality of devices. Meanwhile, through the rear sub platform layout of the sensor network platform, each data may be transmitted independently with the corresponding sub platform of the management platform to ensure the integrity and traceability of data transmission, ensure that the data of each object platform is independent and corresponding without affecting each other, and improve the effectiveness and accuracy of the implementation of the production task plan.

It should be noted that the at least one user platform in the embodiments may be a desktop computer, a tablet computer, a notebook computer, a mobile phone, or any other electronic device capable of data processing and data communication, and may be not limited here. In a specific application, a first server and a second server may adopt a single server or a server cluster, which are not limited here. It should be understood that data processing process mentioned in the embodiment may be processed by a processor of the server, and data stored in the server may be stored on a storage device of the server, such as a hard disk or other memory. In specific applications, the sensor network platform may adopt a plurality of groups of gateway servers or a plurality of groups of intelligent routers, which are not limited here. It should be understood that the data processing process mentioned in the embodiments of the present disclosure may be processed by a processor of the gateway server, and data stored in the gateway server may be stored on a storage device of the gateway server, such as a hard disk and SSD, etc.

Further, the one or more object platforms may be the intelligent manufacturing equipment and management equipment of different workshops, production lines, assembly lines, process steps, process management systems, output management systems, etc. Similarly, the at least one user platform may also be the management equipment or interactive equipment of different workshops, production lines, assembly lines, etc., which may be used to regulate corresponding production and conduct data interaction and task release with the Industrial Internet of Things for implementing the production task plan, etc. Specifically, as a feasible way, the at least one user platform may correspond to different production line management systems, and the one or more object platforms corresponds to the intelligent manufacturing equipment or equipment management equipment in the production line.

In practical application, when any user platform sends a production task plan modification instruction, a production task plan modification data table may be generated, including following steps.

Any user platform may issue a production task plan modification instruction to one or more object platforms based on the production task plan.

The one or more object platforms may respectively correspond to the sub platforms of the independent management platform and the sub platforms of the sensor network platform, the management platform may take the one or more object platforms and its corresponding sub platforms of the independent management platform and its corresponding sub platforms of the sensor network platform as the data association platform information, which corresponds to the corresponding production task plan modification instructions to generate one or more production task plan modification data.

The management platform may take the data association platform information and the corresponding production task plan modification data as one data item, and arrange all data items in order to form the production task plan modification data table.

When a production task plan is released, all the equipment associated with the task plan may be adjusted and controlled accordingly, so that the production lines and workshops may coordinate with each other, and there may be no production fault, discontinuity, product accumulation, efficiency reduction and other differences. Therefore, the production task plan may often involve a plurality of equipment. Based on this, the present disclosure may set a plurality of sub platforms of different service platforms to correspond to different user platforms, thus, different user platforms may issue production task plans separately, and all platforms involved in the plan may be integrated and controlled through data association platform information so as to coordinate and complete the entire production task plan.

In practical application, the general platform of the management platform may receive the first instruction, extract data association platform information and instruction data corresponding to the data association platform information in the production task plan modification data table based on the production task plan modification data table to form one or more independent instruction data packets, merge the instruction number with the one or more instruction data packets to form one or more second instructions and send the one or more second instructions to associated sub platforms of the management platform respectively according to the data association platform information, specially including following steps.

The general platform of the management platform may receive the first instruction, take each data item in the production task plan modification data table as independent extracted data, and merge the data association platform information in each data item with corresponding instruction data to form the instruction data packet.

The general platform of the management platform may extract the instruction number and merge the instruction number with each instruction data packet to form one or more independent second instructions.

The general platform of the management platform may send the one or more second instructions to the corresponding sub platforms of the management platform respectively according to sub platform information of the management platform of the data association platform information in each second instruction.

In a specific application, the sub platforms of the management platform may receive the corresponding second instructions, extract instruction data in the second instructions and update the production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, specifically including following steps.

The sub platforms of the management platform may store the production task plans, and the production task plans may at least include production task plan data packets.

The sub platforms of the management platform may extract the instruction data in the second instruction after receiving the corresponding second instruction.

The sub platforms of the management platform may overwrite the production task plan data packets with the instruction data as update data to form latest production task plan data packets.

The sub platforms of the management platform may package and convert the updated production task plans, the instruction number, and the data association platform information into the configuration files recognizable by the one or more object platforms, store the configuration files and send the configuration files to the sub platform of the sensor network platform corresponding to the data association platform information, respectively.

In the specific application, after receiving the configuration files of all sub platforms of the management platform, the general platform of the sensor network platform may send the configuration files to the one or more object platforms corresponding to the data association platform information according to the data association platform information at a same time, after receiving the configuration files, the one or more object platforms may execute production tasks based on the configuration files, specifically including following steps.

After receiving the second instructions, the sub platforms of the management platform may send prompt information to the general platform of the sensor network platform through corresponding sub platforms of the sensor network platform, respectively.

After receiving the prompt information, the general platform of the sensor network platform may wait for receiving the configuration files.

After receiving the configuration files of all the sub platforms of management platform that send the prompt information, the general platform of the sensor network platform may send the configuration files to corresponding object platforms according to sub platform information of the sensor network platform in the configuration files, respectively.

After receiving the configuration files, the one or more object platforms may execute the production tasks based on the configuration files and the execution result may be fed back.

In some embodiments, in order to confirm the execution result of the production task plan, the one or more object platforms feedback execution result in the following manner.

After receiving the configuration files, the one or more object platforms may execute the production tasks based on the configuration files, merge the data association platform information and execution results as feedback data packets, which may be fed back to the general platform of the sensor network platform.

The general platform of the sensor network platform may send the feedback data packets to the sub platforms of the sensor network platform according to the data association platform information.

The sub platforms of the sensor network platform may receive the feedback data packets and send the feedback data packets to corresponding sub platforms of the management platform, respectively.

The sub platforms of the management platform may receive and store the feedback data packets, convert the feedback data packets into data files recognizable by the management platform, and send the data files to the general platform of the management platform.

The general platform of the management platform may receive the data files and send the data files to corresponding user platforms according to the instruction numbers.

More platforms are required to coordinate during the execution of the production task plan. Therefore, in order to ensure that the execution process of all platforms can be known by their corresponding user platforms and ensure the interoperability of information, the general platform of the management platform may receive the data file and send the data file to the corresponding user platform according to the instruction number in the present disclosure, further comprising follow operations.

The general platform of the management platform may extract all the sub platform information of the management platform corresponding to the data association platform information in the data files based on the data files, and obtain the at least one user platform corresponding to all the sub platforms of the management platform.

The general platform of the management platform may send the data files to the at least one corresponding user platform according to the instruction numbers, and simultaneously send the data files to the at least one user platform corresponding to all the sub platforms of the management platform, respectively.

During specific application, because the production task plans may need to coordinated with each other, different execution equipment may need to execute corresponding production task plans at different times, so as not to affect each other and ensure a continuity and stability of production. Based on this, following operation may be executed.

When the instruction data packet further includes an instruction execution time, after receiving the configuration files, the one or more object platforms may obtain execution times and execute corresponding production task at the execution times.

As shown in FIG. 2, some embodiments of the present disclosure provide a control method of the Industrial Internet of Things for implementing the production task plan. The Industrial Internet of Things used for the implementing a production task plan may include at least one user platform, a service platform, a management platform, a sensor network platform, and one or more object platforms that are interacted sequentially from top to bottom.

The service platform may be arranged in an independent layout, the management platform may be arranged in a front sub platform layout, and the sensor network platform may be arranged in a rear sub platform layout. The independent layout may mean that the service platform is provided with a plurality of independent sub platforms, the plurality of independent sub platforms respectively store, process and/or transmit different data. The front sub platform layout may mean that the management platform is provided with a general platform and a plurality of sub platforms, the plurality of sub platforms may respectively store and process data of different types or different receiving objects sent by the sensor network platform, and after summarizing data of the plurality of sub platforms, the general platform of the management platform may store and process the data, and transmit the data to the service platform. The rear sub platform layout may mean that the sensor network platform is provided with a general platform and a plurality of sub platforms, the plurality of sub platforms may respectively store and process data of different types or different receiving objects sent by the management platform, and the general platform of the sensor network platform may summarize data of the plurality of sub platforms of the sensor network platform, store and process the data, and transmit the data to the one or more object platforms. The one or more object platforms may be configured as one or more intelligent manufacturing devices or one or more manufacturing management devices.

The control method may comprise following operations.

S1: the sub platforms of the service platform may respectively correspond to different user platforms, when any user platform issues a production task plan modification instruction based on an input of the user, a production task plan modification data table may be generated, a corresponding sub platform of the service platform may receive the production task plan modification data table and attach an instruction number to the production task plan modification data table, merge the instruction number with the production task plan modification data table to form a first instruction and send the first instruction to the general platform of the management platform.

S2: the general platform of the management platform may receive the first instruction, extract data association platform information and instruction data corresponding to the data association platform information in the production task plan modification data table based on the production task plan modification data table to form one or more independent instruction data packets, merge the instruction number with the one or more instruction data packets respectively to form one or more second instructions and send the one or more second instructions to associated sub platforms of the management platform respectively according to the data association platform information.

S3: the sub platforms of the management platform may receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, respectively.

S4: the sub platforms of the sensor network platform may receive the configuration files and send the configuration files to the general platform of the sensor network platform, respectively.

S5: after receiving the configuration files of all sub platforms of the management platform, the general platform of the sensor network platform may send the configuration files to the one or more object platforms corresponding to the data association platform information according to the data association platform information at a same time, after receiving the configuration files, the one or more object platforms may execute production tasks based on the configuration files.

Those of ordinary skill in the art can realize that units and algorithm steps of each example described in connection with the embodiments disclosed herein can be realized by electronic hardware, computer software, or any combination thereof. In order to clearly explain an interchangeability of hardware and software, compositions and steps of each example have been generally described in the above description according to functions. Whether these functions are performed in hardware or software depends on the specific application and design constraints of the technical solution. A person skilled in the art may use different methods to realize the described functions for each specific application, but such realization should not be considered beyond the scope of the present disclosure.

In the embodiments provided in the present disclosure, it should be understood that the disclosed equipment and method may be realized in other ways. For example, the equipment embodiments described above are only illustrative. For example, a division of the units is only a logical function division. In actual implementation, there may be another division mode, for example, a plurality of units or components may be combined or integrated into another system, or some features may be ignored or not implemented. In addition, mutual couplings or direct couplings or communication connections shown or discussed may be indirect couplings or communication connections through some interfaces, devices, or units, or may be electrical, mechanical, or other forms of connection.

The units described as separate components may or may not be physically separate, and may be implemented in electronic hardware, computer software, or any combination thereof. Whether these functions are performed in hardware or software may depend on a specific application and design constraints of the technical solution. Different methods may be used for each specific application to implement the described functions, but such implementation should not be considered beyond the scope of the present disclosure.

In addition, each function unit in each embodiment of the present disclosure may be integrated into one processing unit, or each unit may physically exist separately, or two or more units may be integrated into one unit. The above integrated unit may be realized in a form of hardware or software function units.

If the integrated unit is realized in the form of software function units and sold or used as an independent product, the integrated unit may be stored in a computer-readable storage medium. Based on this understanding, essence or parts of the technical solution of the present disclosure that contributes to the prior art, or all or part of the technical solution may be embodied in a form of a software product, which may be stored in a storage medium, including a plurality of instructions for causing a computer device (which may be a personal computer, a server, or a grid device, etc.) to perform all or part of the steps of the method described in each embodiment of the present disclosure. The aforementioned storage medium may include a U disk, a mobile hard disk, a read-only memory (ROM), a random access memory (RAM), a magnetic disk, or an optical disk and other medium that may store program codes.

The above specific embodiments have further detailed the purpose, technical scheme, and beneficial effects of description of the present disclosure. It should be understood that the above are only the specific embodiments of the description and are not used to limit the scope of protection of the present disclosure. Any made modification, equivalent replacement, and improvement within the spirit and principles of the present disclosure should be included in the scope of protection of the present disclosure.

Figure 3:
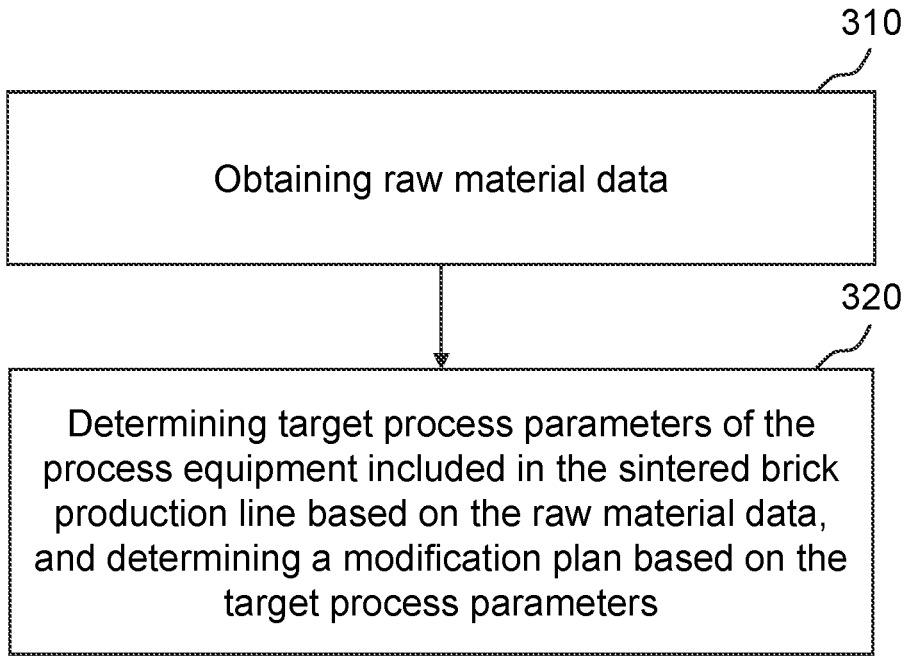
FIG. 3 is an exemplary flowchart of a method of determining a modification plan according to some embodiments of the present disclosure.

FIG. 3 is an exemplary flowchart of a method of determining a modification plan according to some embodiments of the present disclosure. As shown in FIG. 3, the operation 300 may include following steps. In some embodiments, the operation 300 may be performed by a planning module.

In some embodiments, the aforementioned Industrial Internet of Things for implementing the production task plan may be used for production management of an industrial production line, for example, the production management of a sintered brick production line. In some embodiments, the modification instruction may include a sintered brick production task modification instruction input by a user. In some embodiments, determining the modification plan may include following steps.

In step 310, obtaining raw material data.

The raw material data may refer to data information related to raw materials. For example, the raw material data may be information such as a quantity of the raw materials, a composition of the raw materials, a content of each component, and a water content, etc.

In some embodiments, the raw material data may be obtained by a user based on an analytical instrument or sensor. In some embodiments, the raw material data may be obtained by sampling the raw materials for an experimental analysis.

In some embodiments, the raw material data may be obtained by the management platform through the sensor network platform. For example, the management platform may send a raw material data acquisition instruction to the sensor network platform, and the sensor network platform may send the raw material data stored in the sensor network platform to the management platform in response to the raw material data acquisition instruction.

In step 320, determining target process parameters of the process equipment included in the sintered brick production line based on the raw material data, and determining a modification plan based on the target process parameters.

The process equipment may refer to processing equipment required in a process of processing the raw materials into products on the production line. For example, the process equipment may include raw material crushing equipment, mixing equipment, molding equipment, drying equipment, sintering equipment, etc. Each process equipment may correspond to different process parameters. In some embodiments, the process parameters may be parameters corresponding to the process equipment. For example, the target process parameters of the raw material crushing equipment may include a cutting force and a crushing time of the equipment. For example, the target process parameters of the mixing equipment may be an amount of added water and a mixing time. For example, the target process parameters of the molding equipment may refer to plasticity parameters. For another example, the target process parameters of the drying equipment may refer to a drying rate and a drying time. For another example, the target process parameters of the sintering equipment may refer to a preheating time, sintering times at different temperatures, and a holding time.

The target process parameters may refer to values that may be used for production process parameters after an adjustment.

In some embodiments, the target process parameters may be determined according to changes in the raw material data. For example, when hard and soft components in the raw materials are different, the target process parameters may include a value of a processing time of the grinding equipment after adjustment. As another example, when water contents of the raw materials are different, the target process parameters may include a value of an amount of water added to the mixing equipment after adjustment. As another example, if chemical composition contents of the raw materials are different, the target process parameters may include one or more values among plasticity of the molding equipment after adjustment, the amount of water added to the mixing equipment, a processing time of the grinding equipment, a drying time of the drying equipment, and a sintering temperature and the sintering time of the sintering equipment.

In some embodiments, the step 320 may include following steps.

In step 321, the planning module obtains reference material data from the database.

The reference material data may be the raw material data for reference. In some embodiments, the reference material data may be obtained from the database by the planning module. In some embodiments, the database may include a plurality of groups of reference data, and each group of reference data may include the reference material data and reference process parameters. In some embodiments, the reference material data and the reference process parameters may be one-to-one correspondence.

In step 322, the planning module matches the raw material data with the reference material data in the database, determines target reference material data whose matching relationship satisfies a preset condition, and takes process parameters corresponding to the target reference material data as first candidate process parameters.

The first candidate process parameters may be process parameters of the process equipment corresponding to the reference material data whose matching relationship satisfies the preset condition. The first candidate process parameters may include process parameters of the process equipment corresponding to different production stages in the sintered brick production line.

In some embodiments, the matching relationship may refer to a distance or a similarity between vectors. In some embodiments, the preset condition may mean that the distance or similarity between preset vectors is less than a preset threshold, and the preset threshold may be manually set. For example, the preset threshold may be 0.5.

In some embodiments, a raw material data vector and a plurality of reference material data vectors may be constructed respectively, and the reference material data whose matching relationship satisfies the preset condition may be determined based on the distance or similarity between the vectors, and at least one first candidate process parameter may be determined.

In step 323, the planning module determines the target process parameters based on the first candidate process parameters.

In some embodiments, the planning module may also perform at least one iteration update on the first candidate process parameters based on a preset algorithm to obtain the second candidate process parameters. The target process parameters may be determined based on cost values corresponding to the second candidate process parameters.

The preset algorithm may refer to an algorithm set in advance. In some embodiments, the preset algorithm may include a machine learning algorithm. Please refer to the contents of other parts of the present disclosure for details (for example, FIG. 4 and its related descriptions).

In some embodiments, the planning module may determine the target process parameters based on the cost values corresponding to the second candidate process parameters. In some embodiments, the cost values may be costs corresponding to different process parameters. For example, with a change of processing time, the cost of manpower, time and energy may also change.

In some embodiments, the planning module may take process parameters with a lowest cost value among the at least one second candidate process parameters as the target process parameters.

In some embodiments, the planning module may be configured to determine a modification plan based on the target production process parameters, generate an adjustment instruction according to the modification plan, control the corresponding process equipment on the production line to adjust the process parameters according to the modification plan, and use the process parameters in the modification plan for production.

The planning module described in some embodiments of the present disclosure may obtain the raw material data based on the modification instruction input by the user, match actual data with the data in the database, obtain the first candidate process parameters, determine the second candidate process parameters through the machine learning model, and determine the target process parameters based on the first candidate process parameters and the second candidate process parameters, which may quickly determine the process parameters corresponding to the actual data, save a time for adjusting the process parameters, and improve a production efficiency.

It should be noted that the above description of the operation 300 is only for example and explanation, and does not limit the scope of application of the present disclosure. For those skilled in the art, various modifications and changes may be made to the operation 300 under the guidance of the present disclosure. However, these amendments and changes are still within the scope of the present disclosure.

Figure 4:
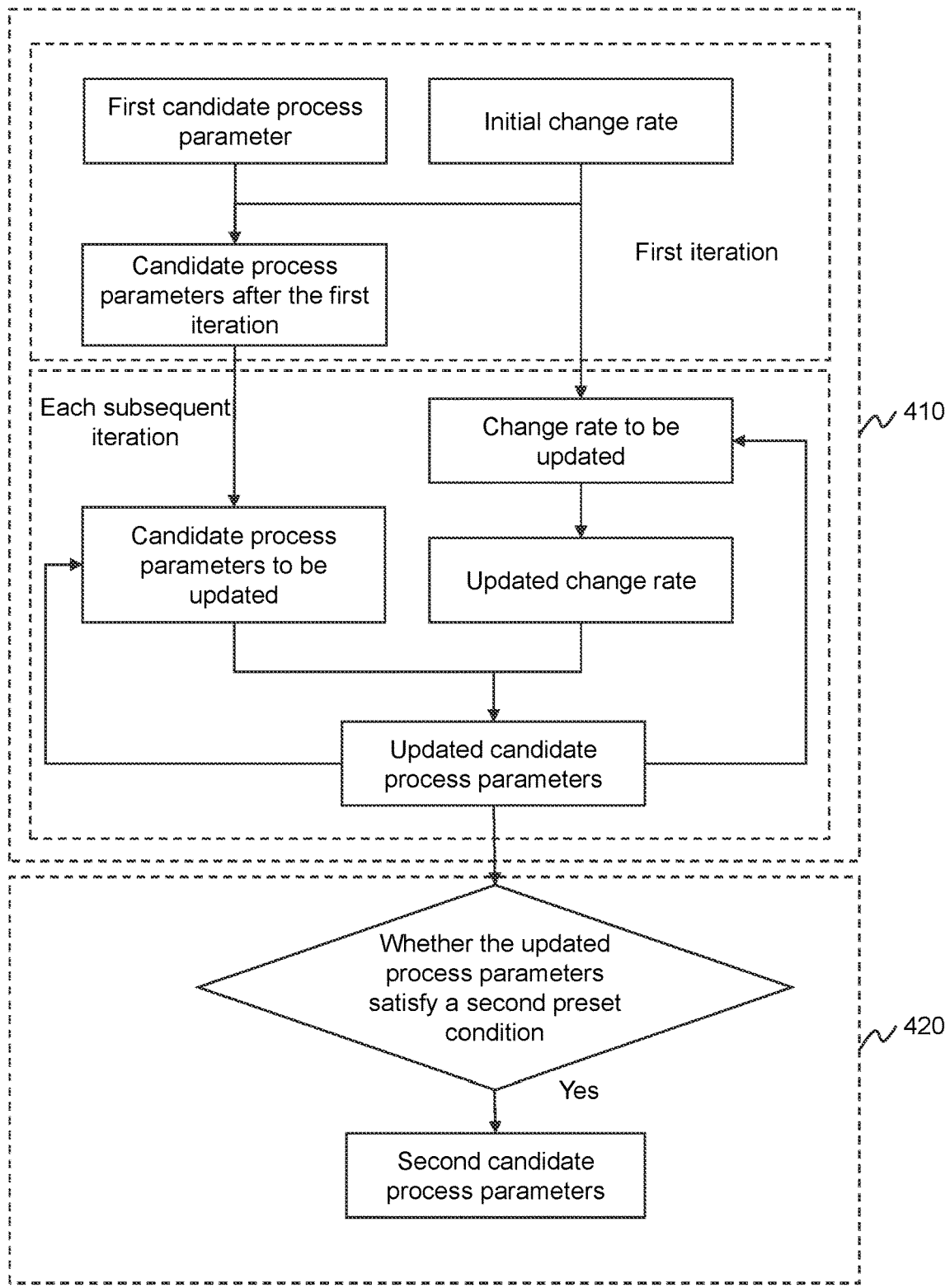
FIG. 4 is a schematic diagram of determining second candidate process parameters based on a preset algorithm according to some embodiments of the present disclosure.

FIG. 4 is a schematic diagram of determining second candidate process parameters based on a preset algorithm according to some embodiments of the present disclosure.

As shown in FIG. 4, operation 400 may include following contents. In some embodiments, the operation 400 may be performed by the planning module.

In some embodiments, the planning module may perform at least one iteration update on each of the at least one first candidate process parameter based on a preset algorithm to obtain at least one updated candidate process parameter, and determine the second candidate process parameters based on the at least one updated candidate process parameter. Specific steps may be as follows.

In step 410, performing at least one iteration update on the first candidate process parameters based on the preset algorithm.

For each of first candidate process parameter, in a process of iteratively updating the first candidate process parameter, each first candidate process parameter may correspond to a change rate, the change rate may include adjustment values of working parameters of the process equipment corresponding to different production stages in the sintered brick production line.

In a first iteration, the first candidate process parameters may be updated based on an initial change rate to obtain candidate process parameters after the first iteration. The candidate process parameters after the first iteration may be taken as process parameters to be updated, and the initial change rate may be taken as a change rate to be updated in a next iteration. The initial change rate may be a preset value, for example, a system default value set according to actual needs, an experience value, a manually preset value, etc. The initial change rate is the change rate to be updated in the first round.

In some embodiments, the first candidate process parameters may be represented by an initialization vector. For example, for a sintered brick production line with a plurality of the process equipment (assuming a number of the process equipment is A), a number of the first candidate process parameters may be set as N. At this time, a dimension of each first candidate process parameter may be A (each dimension may correspond to a piece of the process equipment on the sintered brick production line), and a vector $X_i^0$ corresponding to ith of the first candidate process parameters may be expressed as:

$$(X_{i1}^0, X_{i2}^0, \ldots, X_{iA}^0)$$

The vector $(X_1^0, X_2^0, \ldots, X_N^0)$ corresponding to N of the first candidate process parameters may be expressed as:

$$((X_{11}^0, X_{12}^0, \ldots, X_{1A}^0), (X_{21}^0, X_{22}^0, \ldots, X_{2A}^0), \ldots, (X_{N1}^0, X_{N2}^0, \ldots, X_{NA}^0))$$

where 0 is an identifier (representing a 0th iteration, i.e., an initial value of the iteration has not yet started), i is a serial number of the first candidate process parameters, and i≤N.

In each subsequent iteration, the change rate to be updated may be updated to obtain an updated change rate, and the candidate process parameters to be updated may be updated based on the updated change rate to obtain updated candidate process parameters. The updated candidate process parameters may be taken as the candidate process parameters to be updated in a next round, and the updated change rate may be taken as the change rate to be updated in a next round.

In some embodiments, the update of the change rate to be updated may be achieved by updating the sub change rate. As used herein, the sub change rate may be an element of each dimension of the change rate, and the change rate may include a plurality of sub change rates. There may be a corresponding relationship between the working parameters of each process equipment and each sub change rate in the candidate process parameters to be updated. The sub change rate may be used to represent adjustment values of the working parameters of corresponding process equipment.

In some embodiments, the sub change rate to be updated may be updated based on a current loss in a previous round, and the updated sub change rate may be used as the sub change rate to be updated in a next round. As used herein, the current loss in the previous round may be determined based on a difference between the candidate process parameters obtained in the previous round and historical optimal process parameters.

For example, after the (k+1)th iteration, the updated change rate may be calculated by following formula (1):

$$V_{ia}^{k+1} = \omega V_{ia}^k + c_1 r_1 (P_{ia,pbest}^k - X_{ia}^k) + c_2 r_2 (P_{a,best}^k - X_{ia}^k) \quad (1)$$

where i represents a serial number of the first candidate process parameters, i=1, 2, 3, ..., N, and i≤N; a represents a count of each process equipment on the sintered brick production line, a=1, 2, 3, ..., A; k is a number of iterations, and k≥0. $V_{ia}^k$ represents the change rate to be updated of the ith of the first candidate process parameters obtained in a kth iteration; $X_{ia}^k$ represents a value of the ith of the candidate process parameters at a piece of the process equipment obtained in the kth iteration. ω is an inertia weight constant; $c_1$ is an individual learning factor; $c_2$ is a group learning factor; $r_1$, $r_2$ is random constants in an interval of [0, 1], which is used to increase a randomness of the search. $P_{ia,pbest}^k$ represents a value of a historical optimal solution of the ith of the candidate process parameters at a ath piece of the process equipment after the kth iteration. At this time, an optimal solution may refer to a set of the working parameters of each process equipment corresponding to the candidate process parameters (i.e., an individual historical optimal solution) when a cost value of the production line with the candidate process parameters reaches a minimum value after the kth iteration. $P_{ia,pbest}^k$ represents a value of the optimal solution of all N first candidate process parameters at the ath piece of the process equipment in the process of previous iterations after the kth iteration of the group. At this time, the optimal solution may refer to a set of working parameters of each process equipment corresponding to the candidate process parameters with a lowest cost value among the above-mentioned candidate process parameters with the lowest cost value in previous iterations after the kth iteration (i.e., a group historical optimal solution).

The inertia weight constant ω, the individual learning factor $c_1$, a group learning factor $c_2$ and the random constants $r_1$ and $r_2$ may be system default values, experience values, manually preset values, or any combination thereof set according to actual needs.

In some embodiments, a maximum absolute value of the sub change rate in each iteration may be $v_{max}$, which refers to a maximum adjustment value of the working parameters corresponding to each process equipment. In a k+1 iteration, a change rate $V_i$ formed by adjustment values of the working parameters corresponding to each candidate process parameters may be expressed as $(v_{i1}, v_{i2}, \ldots, v_{iA})$. A vector of multi-dimensional change corresponding to N candidate process parameters may be expressed as $((v_{11}, v_{12}, \ldots, v_{1A}), (v_{21}, v_{22}, \ldots, v_{2A}), \ldots, (v_{N1}, v_{N2}, \ldots, v_{NA}))$. As used herein, a value of any sub change rate in the vector may be negative, but an absolute value of any sub change rate in the vector may be not greater than $v_{max}$.

In some embodiments, each candidate process parameter may be updated based on a sub change rate among the updated change rates. For example, after the k+1 iteration, the updated candidate process parameters may be calculated by a following formula (2):

$$X_{ia}^{k+1} = X_{ia}^k + V_{ia}^{k+1} \quad (2)$$

For example, after the first iteration, the ith of the updated candidate process parameter may be calculated by the following formula (3):

$$X_i^1 = (X_{i1}^1, X_{i2}^1, \ldots, X_{iA}^1) = (X_{i1}^0 + v_{i1}^1, X_{i2}^0 + v_{i2}^1, \ldots, X_{iA}^0 + v_{iA}^1) \quad (3)$$

A vector expression corresponding to N updated candidate process parameters may be calculated by a following formula (4):

$$(X_1^1, X_2^1, \ldots, X_N^1) = ((X_{11}^1, X_{12}^1, \ldots, X_{1A}^1), \\ ((X_{21}^1, X_{22}^1, \ldots, X_{2A}^1), \ldots, (X_{N1}^1, X_{N2}^1, \ldots, X_{NA}^1) = (X_{11}^0 + v_{11}^1, X_{12}^0 + v_{12}^1, \ldots, X_{1A}^0 + v_{1A}^1), \\ (X_{21}^0 + v_{21}^1, X_{22}^0 + v_{22}^1, \ldots, X_{2A}^0 + v_{2A}^1), \ldots, \\ (X_{N1}^0 + v_{N1}^1, X_{N2}^0 + v_{N2}^1, \ldots, X_{NA}^0 + v_{NA}^1))) \quad (4)$$

In some embodiments, in each iteration update, there may be constraint conditions for the working parameters of each process equipment in the candidate process parameters, and the constraint conditions may be dynamically updated according to different parameters in different production stages. For example, there may be a reasonable range for each element value (working parameters of each process equipment) in the candidate process parameters. At the same time, there may be a constraint relationship between different elements. For example, different water consumption when mixing the raw materials may lead to different molding times, and a reasonable time range of a subsequent drying process may also be different.

In some embodiments, the planning module may determine constraint conditions based on the obtained raw material data, may determine the constraint conditions based on user instructions, and may also determine the constraint conditions in other possible ways.

In some embodiments, if element values in the candidate process parameters do not satisfy the constraint conditions during the iteration, the element values that do not satisfy the constraint conditions may be initialized or given a value that satisfies the constraint conditions to continue the iteration.

In some embodiments, when the first candidate process parameters are iteratively updated, if the iteration satisfies preset conditions for ending the iteration, the iterative update may end, and at least one updated candidate process parameter may be obtained. As used herein, the preset conditions for ending the iteration may be that numbers of the iterations reach a threshold, or an iteration result satisfies a first preset condition. As used herein, the first preset condition may be that a cost value corresponding to at least one candidate process parameter is less than a preset threshold. As used herein, the preset threshold may be set according to an actual production demand.

In step 420, determining second candidate process parameters based on the updated candidate process parameters.

In some embodiments, the planning module may be configured to determine whether to take the updated process parameters as the second candidate process parameters based on whether the updated process parameters satisfy a second preset condition. As used herein, the second preset condition may include whether each sub process parameter in the updated process parameters conforms to a first preset range and whether relationship values between different sub process parameters conform to a second preset range.

The sub process parameters may refer to the working parameters of the process equipment corresponding to different production stages.

The first preset range may refer to a reasonable range of working parameters of the process equipment corresponding to different production stages. For example, the first preset range may be an interval range composed of one or more fixed values. The first preset range may be a system default value or manually determined according to actual production requirements.

The second preset range may refer to a preset reasonable range that relationship values between the plurality of sub process parameters meet. For example, the second preset range may be an interval range composed of one or more fixed values.

In some embodiments, when the second preset condition is satisfied, the updated candidate process parameters may be taken as the second candidate process parameters. For example, when each sub process parameter in the updated process parameters satisfies the first preset range, and the relationship values between different sub process parameters satisfy the second preset range, the updated process parameters may be taken as the second candidate process parameters.

According to the Industrial Internet of Things for implementing the production task plan and a control method thereof described in some embodiments of the present disclosure, on a premise of satisfying production demand conditions, combined with cost factors, and according to different raw material data information, optimal production process parameters of sintered bricks may be determined quickly and accurately, and adjusted in time, the efficiency is high, which can satisfy the needs of users.

Figure 5:
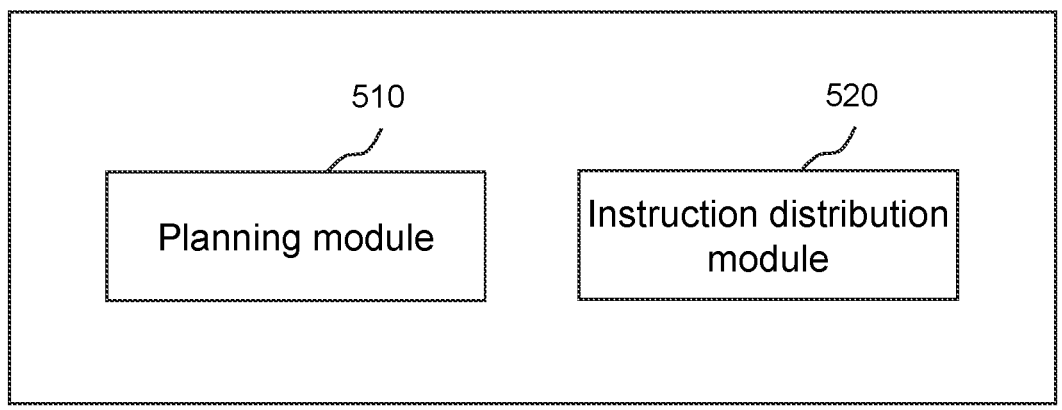
FIG. 5 is an exemplary module diagram of the Industrial Internet of Things for implementing the production task plan according to some embodiments of the present disclosure.

FIG. 5 is an exemplary module diagram of a control system of the Industrial Internet of Things for implementing the production task plan according to some embodiments of the present disclosure. As shown in FIG. 5, the system 500 may at least include a planning module 510 and an instruction distribution module 520.

The planning module 510 may be configured to receive a modification instruction from a user and determine a modification plan. In some embodiments, the planning module 510 may be executed by the service platform and the management platform.

For more information about receiving the modification instruction from a user and determining the modification plan, please refer to the descriptions in other parts of the present disclosure (for example, the relevant descriptions in FIG. 2, FIG. 3, and FIG. 4).

The instruction distribution module 520 may be configured to determine an execution instruction based on the modification plan and distribute the execution instruction. In some embodiments, the instruction distribution module 520 may be executed by the sensor network platform.

For more information about determining the execution instruction and distributing the execution instruction, please refer to the description in other parts of the present disclosure (for example, the relevant description in FIG. 2).

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. An Industrial Internet of Things for implementing a production task plan, the Industrial Internet of Things comprising at least one user platform, a service platform, a management platform, a sensor network platform, and one or more object platforms that are interacted sequentially from top to bottom, wherein the service platform is arranged in an independent layout, the management platform is arranged in a front sub platform layout, and the sensor network platform is arranged in a rear sub platform layout; the independent layout means that the service platform is provided with a plurality of independent sub platforms, the plurality of independent sub platforms respectively store, process and transmit different data; the front sub platform layout means that the management platform is provided with a general platform and a plurality of sub platforms, the plurality of sub platforms of the management platform respectively store and process data of different types or different receiving objects sent by the sensor network platform, and after summarizing data of the plurality of sub platforms of the management platform, the general platform of the management platform stores and processes the data, and transmits the data to the service platform; the rear sub platform layout means that the sensor network platform is provided with a general platform and a plurality of sub platforms, the plurality of sub platforms of the sensor network platform respectively store and process data of different types or different receiving objects sent by the management platform, and the general platform of the sensor network platform summarizes data of the plurality of sub platforms of the sensor network platform, stores and processes the data, and transmits the data to the one or more object platforms; the one or more object platforms are configured as one or more intelligent manufacturing devices or one or more manufacturing management devices;

the sub platforms of the service platform respectively correspond to different user platforms, when any user platform issues a production task plan modification instruction based on an input of the user, a production task plan modification data table is generated, a corresponding sub platform of the service platform receives the production task plan modification data table and attaches an instruction number to the production task plan modification data table, merges the instruction number with the production task plan modification data table to form a first instruction and sends the first instruction to the general platform of the management platform;

the general platform of the management platform receives the first instruction, extracts data association platform information and instruction data corresponding to data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information;

the sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, respectively;

the sub platforms of the sensor network platform receive the configuration files and send the configuration files to the general platform of the sensor network platform, respectively; and after receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files.

2. The Industrial Internet of Things for implementing the production task plan of claim 1, wherein when any user platform issues a production task plan modification instruction based on an input of the user, a production task plan modification data table is generated, including:
  any user platform issuing the production task plan modification instruction to one or more object platforms based on the production task plan;
  the one or more object platforms respectively corresponding to the independent sub platforms of the management platform and the independent sub platforms of the sensor network platform, the management platform taking the one or more object platforms and the corresponding independent sub platforms of the management platform and the corresponding independent sub platforms of the sensor network platform as the data association platform information, and matching the data association platform information with the corresponding production task plan modification instruction to generate one or more production task plan modification data; and
  the management platform taking the data association platform information and the corresponding production task plan modification data as one data item, and arranging all data items in order to form the production task plan modification data table.

3. The Industrial Internet of Things for implementing the production task plan of claim 2, wherein the general platform of the management platform receives the first instruction, extracts data association platform information and instruction data corresponding to the data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information, including:
  the general platform of the management platform receiving the first instruction, taking each data item in the production task plan modification data table as independent extracted data, and merging the data association platform information in each data item with corresponding instruction data to form the instruction data packets;
  the general platform of the management platform extracting the instruction number and merging the instruction number with each instruction data packet to form one or more independent second instructions; and
  the general platform of the management platform sending the one or more second instructions to the corresponding sub platforms of the management platform respectively according to sub platform information of the management platform of the data association platform information in each second instruction.

4. The Industrial Internet of Things for implementing the production task plan of claim 2, wherein the sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, including:
  the sub platforms of the management platform storing the production task plans, the production task plans at least including production task plan data packets;
  the sub platforms of the management platform extracting the instruction data in the second instruction after receiving the corresponding second instruction;
  the sub platforms of the management platform overwrite the production task plan data packets with the instruction data as update data to form latest production task plan data packets; and
  the sub platforms of the management platform packaging and converting the updated production task plans, the instruction number and the data association platform information into the configuration files recognizable by the one or more object platforms, storing the configuration files and sending the configuration files to the sub platform of the sensor network platform corresponding to the data association platform information, respectively.

5. The Industrial Internet of Things for implementing the production task plan of claim 2, wherein after receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files, including:
  after receiving the second instructions, the sub platforms of the management platform sending prompt information to the general platform of the sensor network platform through corresponding sub platforms of the sensor network platform, respectively;
  after receiving the prompt information, the general platform of the sensor network platform waiting for receiving the configuration files;
  after receiving the configuration files of all the sub platforms of management platform that send the prompt information, the general platform of the sensor network platform sending the configuration files to corresponding object platforms according to sub platform information of the sensor network platform in the configuration files, respectively; and
  after receiving the configuration files, the one or more object platforms executing the production tasks based on the configuration files.

6. The Industrial Internet of Things for implementing the production task plan of claim 1, wherein
  after receiving the configuration files, the one or more object platforms executes the production tasks based on the configuration files, merges the data association platform information and execution results as feedback data packets, which are fed back to the general platform of the sensor network platform;
  the general platform of the sensor network platform sends the feedback data packets to the sub platforms of the sensor network platform according to the data association platform information;
  the sub platforms of the sensor network platform receive the feedback data packets and send the feedback data packets to corresponding sub platforms of the management platform, respectively;

the sub platforms of the management platform receive and store the feedback data packets, convert the feedback data packets into data files recognizable by the management platform, and send the data files to the general platform of the management platform; and the general platform of the management platform receives the data files and send the data files to corresponding user platforms according to the instruction numbers.

7. The Industrial Internet of Things for implementing the production task plan of claim 6, further comprising:

the general platform of the management platform extracting all the sub platform information of the management platform corresponding to the data association platform information in the data files based on the data files, and obtaining the at least one user platform corresponding to all the sub platforms of the management platform; and the general platform of the management platform sending the data files to the at least one corresponding user platform according to the instruction numbers, and simultaneously sending the data files to the at least one user platform corresponding to all the sub platforms of the management platform, respectively.

8. The Industrial Internet of Things for implementing the production task plan of claim 1, wherein when the instruction data packet further includes an instruction execution time;

after receiving the configuration files, the one or more object platforms obtain execution times and execute corresponding production tasks at the execution times.

9. A control method of an Industrial Internet of Things for implementing a production task plan, wherein the Industrial Internet of Things includes: at least one user platform, a service platform, a management platform, a sensor network platform, and at least one object platform that are interacted sequentially from top to bottom;

the service platform is arranged in an independent layout, the management platform is arranged in a front sub platform layout, and the sensor network platform is arranged in a rear sub platform layout; the independent layout means that the service platform is provided with a plurality of independent sub platforms, the plurality of independent sub platforms respectively store, process and transmit different data; the front sub platform layout means that the management platform is provided with a general platform and a plurality of sub platforms, the plurality of sub platforms of the management platform respectively store and process data of different types or different receiving objects sent by the sensor network platform, and after summarizing data of the plurality of sub platforms of the management platform, the general platform of the management platform stores and processes the data, and transmits the data to the service platform; the rear sub platform layout means that the sensor network platform is provided with a general platform and a plurality of sub platforms, the plurality of sub platforms of the sensor network platform respectively store and process data of different types or different receiving objects sent by the management platform, and the general platform of the sensor network platform summarizes data of the plurality of sub platforms of the sensor network platform, stores and processes the data, and transmits the data to the one or more object platforms; the one or more object platforms are configured as one or more intelligent manufacturing devices or one or more manufacturing management devices;

wherein the control method comprises:

the sub platforms of the service platform respectively correspond to different user platforms, issuing, by any user platform, a production task plan modification instruction based on an input of the user, a production task plan modification data table is generated, a corresponding sub platform of the service platform receives the production task plan modification data table and attaches an instruction number to the production task plan modification data table, merges the instruction number with the production task plan modification data table to form a first instruction and sends the first instruction to the general platform of the management platform;

the general platform of the management platform receives the first instruction, extracts data association platform information and instruction data corresponding to data association platform information in the production task plan modification data table based on the production task plan modification data table to form one or more independent instruction data packets, merges the instruction number with the one or more instruction data packets respectively to form one or more second instructions and sends the one or more second instructions to associated sub platforms of the management platform respectively according to the data association platform information;

the sub platforms of the management platform receive the corresponding second instructions, extract instruction data in the second instructions and update production task plans of the sub platforms of the management platform, package and convert the instruction number, the data association platform information and the updated production task plans into configuration files recognizable by the one or more object platforms, store the configuration files and send the configuration files to corresponding sub platforms of the sensor network platform, respectively;

the sub platforms of the sensor network platform receive the configuration files and send the configuration files to the general platform of the sensor network platform, respectively; and after receiving the configuration files of all sub platforms of the management platform, the general platform of the sensor network platform sends the configuration files to the one or more object platforms corresponding to the data association platform information according to the data association platform information at a same time, after receiving the configuration files, the one or more object platforms execute production tasks based on the configuration files.

\* \* \* \* \*